Aug. 13, 1940.　　F. W. SCHWINN　　2,211,548
FREEWHEELING HUB
Original Filed Sept. 21, 1938
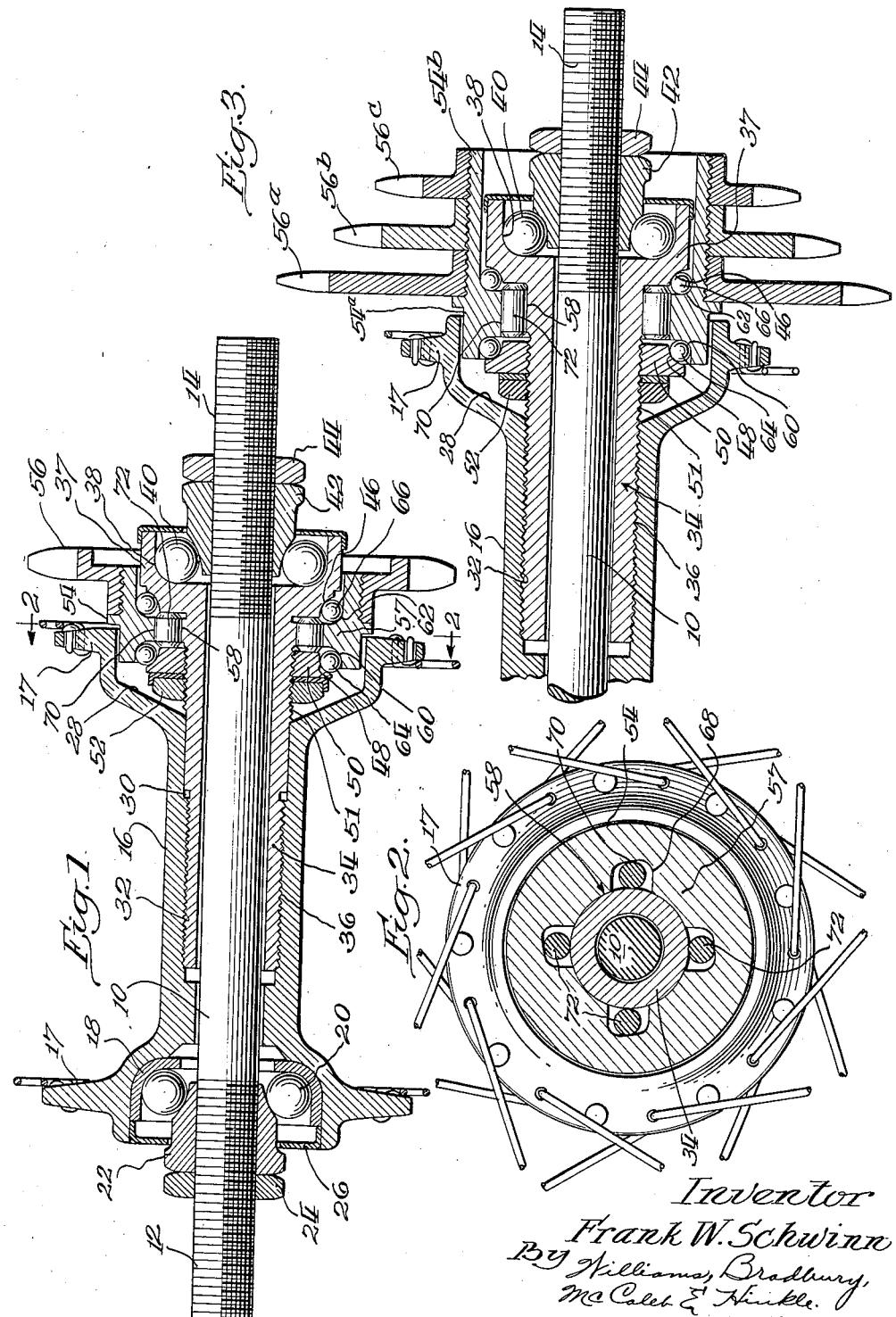
Inventor
Frank W. Schwinn
By Williams, Bradbury,
McCaleb & Hinkle.
Attys.

Patented Aug. 13, 1940

2,211,548

UNITED STATES PATENT OFFICE 2,211,548

FREEWHEELING HUB

Frank W. Schwinn, Chicago, Ill.

Application September 21, 1938, Serial No. 230,921
Renewed June 24, 1940

12 Claims. (Cl. 192—64)

My invention relates to freewheeling or coaster hubs for the drive wheels of bicycles and other velocipedes in which the wheel can overrun the drive sprocket in one direction to permit coasting with the pedals stationary.

In hubs of this nature it is an advantage to provide a device that is simple and inexpensive to manufacture and is compact in design. Such a device should be light in weight and allow the use of a sprocket of minimum diameter without substantially increasing the over-all length of the hub. Preferably, the wheel should be carried on bearings different from, and adjustable independently of, those which carry the overrunning clutch, so that each set may be adjusted independently and so that misalignment of one set of bearings will not affect the others. Also, it is an advantage to have the freewheeling mechanism removable from the hub as a unit, so that repairs and adjustments can be made and the device reassembled without necessitating additional adjustment of the overrunning mechanism after assembly. In such a device, friction should be reduced to a minimum, especially when the wheel is being driven forward. It is also an advantage so to design such a hub that it may carry two or more sprockets for use with the derailleur type of multiple speed drive.

It is an object of this invention to provide a novel freewheeling hub embodying the above-mentioned advantageous characteristics.

Other objects and advantages will become apparent from the following description of a preferred embodiment of the invention.

In the drawing:

Fig. 1 is a longitudinal sectional view of a bicycle rear wheel hub embodying the present invention;

Fig. 2 is a sectional view taken in the direction of the arrows along the line 2—2 of Fig. 1 and illustrates the construction of the overrunning clutch; and Fig. 3 is a longitudinal sectional view of the sprocket end of a hub similar to that shown in Fig. 1 but particularly adapted for use with a derailleur type multiple speed drive.

In the drawing, the freewheeling or coaster hub is mounted upon a fixed central axle 10 provided with threaded portions 12 and 14 at each end. In assembling the wheel into a bicycle, this axle 10 is secured in the rear fork by means of nuts, not shown, threaded upon the portions 12 and 14 in a manner well known. The hub proper consists of a hollow hub shell 16 having spoke flanges 17 at its ends and belled at its left end, as viewed in Fig. 1, to embrace a bearing cup 18 which forms a race to contain the ball bearings 20. These ball bearings 20 are held in place by, and run around, a cone 22 threaded upon the axle portion 12 and locked against movement by a lock nut 24. A dust seal 26 of pliable material, such as leather, is secured in the end of the hub and touches the cone 22, thereby excluding dirt from the antifriction bearings.

The opposite or right end of the hub is belled at 28 to accommodate the clutch mechanism which is somewhat larger than the bearing at the left end. The central opening through the hub shell or sleeve 16, which at the left end of the hub is merely large enough to clear the axle 10, is of larger diameter at the right end and extends through the hub at this larger diameter well toward the opposite end, thereby providing a deep recess 30, the inner portion of which is internally threaded at 32.

A hardened internal sleeve 34 is formed with external threads 36 at one end to engage the threads 32, thereby enabling the sleeves 16 and 34 to be assembled into a solid unit. The outer end of the sleeve 34 is belled at 37 to provide a bearing race 38 to contain ball bearings 40. These bearings are held in place by, and run against, an adjustable bearing cone 42 threaded on the axle portion 14. A lock nut 44 prevents movement of the cone 42 after proper bearing adjustments have been made.

It will be seen from the above that when in assembled position, the hub shell 16 and inner sleeve 34 become in effect a single hub shell piece, and that the rotation of the wheel and hub 16 always takes place upon the bearings 20 and 40, thus enabling the adjustment of these bearings by means of the cones 22 and 42 without the necessity for allowing for any freewheeling function.

The external shoulder of the bell 37 is shaped to provide a bearing cone 46 which faces another similar cone 48 upon the face of an adjustable nut 50. This nut 50 is threaded upon the inner sleeve 34 at 51 to provide adjustability of the distance between the two cones 46 and 48. A lock nut 52 serves to prevent spreading of the cones 46 and 48 after adjustment.

A hardened annular free running ring 54 carries a sprocket 56 threaded thereto and extends at 57 radially inwardly between the cones 46 and 48 almost to the surface of the hardened sleeve 34. At this point the sleeve 34 should be ground to provide an annular clutch ring 58. The opposite sides of the inwardly extending portion 57 are ground to provide bearing races 60 and 62 which contain ball bearings 64 and 66, the opposite faces of which run against the cones 48 and 46, respectively. Thus, by proper adjustment of the cone 48, the free running properties of the ring 54, with respect to the sleeve 34, can be assured. This adjustment should be made before threading the sleeve 34 into the hub member 16.

The inwardly extending portion 57 is provided with a plurality of transverse cut-out portions 68 spaced radially around the clutch ring 58. All of these cutouts 68 are similar and have upper surfaces 70, the trailing edges of which, when the sprocket 56 is rotated in a forwardly direction, are closer to the ring 58 than the leading edges. Each of these openings 68 contains a roller 72 of a diameter greater than the distance between the trailing edge of the surface 70 and the ring 58, but less than the distance between the ring 58 and the leading edge of the surface 70. Thus, as the sprocket 56 is revolved to propel the bicycle forward, the rollers 72 will become wedged between the ring 58 and the upper surface 70 of the cutouts 68, thereby forcing the sleeve 34 and hub 16 to revolve with the sprocket 56. When the rider stops pedaling, the sprocket 56 becomes stationary, and because of the continued rotation of the hub 16 and ring 58, the rollers 72 are carried forward into a position where they no longer wedge between the ring 58 and the surface 70. In this coasting position the wheel runs on the ball bearings 20 and 40 while the freewheeling mechanism runs on the ball bearings 64 and 66; thus, the frictional losses in the coasting position are very small.

In the driving position, the wheel revolves on the same bearings 20 and 40 while no other relative motion takes place within the freewheeling hub. Thus, when pedaling there are no frictional losses in this hub beyond those encountered in a straight drive hub having no freewheeling mechanism whatever.

In Fig. 3 is shown a modification which illustrates how easily the above-described device may be adapted for use with a multiple speed drive of the derailleur type. Here the construction may be the same as that previously described, excepting that the free running ring 54a, which is similar to ring 54, has an elongated threaded skirt 54b, upon which several sprockets 56a, 56b, and 56c may be mounted side by side, instead of the narrow skirt which carries the single sprocket 56, as shown in Fig. 1.

The sprocket or clutch bearings 64 and the clutch elements 72 more or less radially overlap the wheel or shell bearings 40. That is, they have about the same radius from the axis of the axle 10. This is made possible by placing the sprocket bearings 64 and clutch elements 72 in planes axially spaced from the plane of the shell bearings 40. As a result, in incorporating a freewheeling feature into a bicycle hub according to my invention, the over-all diameter of the ring 54 or 54a may be kept at a minimum, in turn permitting use of sprockets of comparatively small diameters,—and yet the over-all length of the hub is not substantially increased.

Although I have illustrated and described what I consider to be a preferred embodiment, it will be understood that I contemplate that reasonable departures may be made therefrom without departing from the scope of this invention and that the scope of this invention is to be determined by an inspection of the following claims.

I claim:

1. A freewheeling hub comprising a fixed central shaft, a spoke-flanged hub shell surrounding the shaft, an anti-friction bearing at each end for journaling the hub shell on the shaft, a sprocket axially beyond one spoke-flange, an overrunning clutch operatively interposed between the sprocket and the hub shell, and an anti-friction bearing for journaling the sprocket on the hub shell, the sprocket bearing and the clutch being axially offset from the plane of the adjacent shell bearing and more or less radially overlapping the shell bearing.

2. A freewheeling hub according to claim 1 wherein the clutch and sprocket bearings are offset axially inwardly from the adjacent shell bearing, and the hub shell includes a tubular extension extending axially to engage the anti-friction elements of the shell bearing, with the clutch and sprocket bearings surrounding the extension but radially within the adjacent spoke-flange of the hub.

3. A freewheeling hub according to claim 1 in which the teeth of the sprocket are axially offset from the clutch and sprocket bearings to bring the teeth substantially into the plane of the adjacent shell bearing.

4. A freewheeling hub comprising a fixed central shaft, a hub shell surrounding the shaft, right and left bells carried by the hub shell, a bearing near each end of the hub shell journaling the hub shell on the shaft, the bearing at the sprocket end of the hub being axially beyond the adjacent bell, the hub shell having a tubular extension engaging the last-mentioned shell bearing, a sprocket, the teeth of which are axially beyond the adjacent bell, an axially spaced pair of anti-friction bearings journaling the sprocket on the shell extension, clutch elements operatively interposed between the extension and sprocket and disposed medially of the planes of the sprocket bearings, the clutch elements and the sprocket bearings substantially radially overlapping the adjacent shell bearing and the adjacent bell extending over the clutch elements and one of the sprocket bearings.

5. A freewheeling hub according to claim 4 wherein the portion of the bell which is over the clutch elements comes into such close working contact with the sprocket as substantially to exclude dirt.

6. A freewheeling hub according to claim 1 wherein the teeth of the sprocket are offset axially outwardly beyond its bearing.

7. A freewheeling hub comprising a fixed central shaft, a hub shell surrounding the shaft, a spoke-flange carried by the shell, a tubular extension for the hub shell formed separately therefrom and threaded into the bore of the shell fixedly to mount the extension in the shell, an extension anti-friction bearing journaling the outer end of the extension, and thereby the adjacent end of the hub shell on the shaft, an anti-friction bearing operatively interposed between the other end of the shell and the shaft for journaling that end of the shell on the shaft, a sprocket surrounding the extension, an anti-friction bearing journaling the sprocket on the extension, and an overrunning clutch operatively interposed between the sprocket and the extension, the sprocket, its bearing and the clutch being mounted wholly on the extension whereby they may be removed together with the extension as a unit.

8. A freewheeling hub according to claim 7 wherein the sprocket bearing and the clutch are disposed in more or less radially overlapping relation to the extension bearing and at the inward side thereof.

9. A freewheeling hub according to claim 7 wherein the sprocket bearing and the clutch are disposed in more or less radial overlapping relation to the extension bearing and at the inward side thereof, and wherein at least portions of the sprocket, sprocket bearing and clutch elements lie substantially within the adjacent bell.

10. A freewheeling hub according to claim 1 wherein there are two anti-friction bearings for journaling the sprocket on the hub shell—one on each side of the clutch.

11. A freewheeling hub according to claim 1 wherein the teeth of the sprocket are offset axially outwardly beyond the clutch.

12. A freewheeling hub according to claim 1 wherein the teeth of the sprocket are offset axially outwardly beyond both its bearing and the clutch.

FRANK W. SCHWINN.